(12) United States Patent
Hoefler

(10) Patent No.: US 6,742,969 B1
(45) Date of Patent: Jun. 1, 2004

(54) MILLING CUTTER INSERT WITH CHIP CONTROL AND MILLING CUTTER USING THE SAME

(75) Inventor: Brian D. Hoefler, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/328,865

(22) Filed: Dec. 24, 2002

(51) Int. Cl.$^7$ ................................................. B23B 5/20
(52) U.S. Cl. ...................................................... 407/34
(58) Field of Search ........................... 407/34, 113, 114, 407/115, 35, 116

(56) References Cited

U.S. PATENT DOCUMENTS

| | | |
|---|---|---|
| 2,186,417 A | 1/1940 | Kraus |
| 3,434,190 A | 3/1969 | Kaiser |
| 4,475,851 A * | 10/1984 | Hale .......................... 407/113 |
| 5,810,521 A * | 9/1998 | Pantzar et al. ............... 407/114 |
| 5,957,628 A * | 9/1999 | Bentjens et al. .............. 407/35 |
| 6,599,061 B1 * | 7/2003 | Nelson ........................ 407/114 |

* cited by examiner

Primary Examiner—Willmon Fridie, Jr.
(74) Attorney, Agent, or Firm—Larry R. Meenan

(57) ABSTRACT

A milling cutting insert is disclosed having a polygonal body of wear-resistant material, wherein the body has a top surface and a groove having a central axis extending along the entire length of one side of the insert having a central axis, and wherein: the group groove is tapered such that the width of the groove increases continuously along the side of the insert. A face milling cutter having an axial location surface for advancement in a direction of feed is also disclosed utilizing such a cutting insert so that a corner of the cutting insert is furthest from the axial location surface and the wide end of the groove associated with the cutting edge facing the direction of feed is adjacent to that corner.

35 Claims, 6 Drawing Sheets

MILLING CUTTER INSERT WITH CHIP CONTROL AND MILLING CUTTER USING THE SAME

BACKGROUND OF THE INVENTION

1. Field of the Invention

This invention is directed to cutting inserts and, more particularly, to a cutting insert with chip control features used for metalworking operations and a milling cutter using the same.

2. Description of Related Art

The efficiency of a metalworking operation is directly affected by forces upon and the temperature of the cutting edge of a cutting insert and by the production and formation of curled segments, or chips, removed from the workpiece during the cutting operation. Chips may be used to carry away from the workpiece and from the cutting tool heat produced during the cutting operation thereby preventing excess heat build-up that could damage the cutting tool. However, there are optimum sizes for such chips and while a longer chip may carry away more heat, if the chip is too long it may curl back upon itself and become tangled or it may curl back upon and damage the workpiece. Therefore, it is desired to produce chips that effectively remove heat from the cutting tool but do not impart damage to the cutting tool or to the workpiece and to reduce the forces upon and the temperature of the cutting edge.

Typically a cutting insert is mounted within a milling cutter so that a corner of the insert furthest from an axial location surface of a cutter body in which the insert is mounted is the first part of the insert to engage the workpiece. As a result, that corner of the insert experiences significant forces and temperatures and is prone to premature degradation. One symptom of such degradation is the generation of burrs on the workpiece. While this may not affect the functionality of the finished workpiece, in most applications the finished workpiece should be free of burrs. This is particularly important in components used for powertrains. If a burr breaks free from a powertrain component, the lubrication system of the powertrain may become clogged by the burr and may malfunction. Additionally, burrs may damage bearings within the powertrain. Furthermore still, during heat treatment of a workpiece, burrs extending from the workpiece may cause an electrical short in any induction hardening equipment due to the close proximity to the heating coils and the workpiece.

Therefore, a further object of the subject invention is to provide a cutting insert geometry that will minimize degradation of a cutting edge on a cutting insert and will in the process reduce the occurrence of burrs upon the workpiece.

SUMMARY OF THE INVENTION

The invention is directed to a milling cutting insert comprising a polygonal body of wear resistant material, wherein the body has a top surface and a bottom surface opposing one another and therebetween a peripheral wall with sides and corners. The intersection of said peripheral wall and said top surface form a cutting edge. The top surface has a groove with a central axis and extends along the entire length of one side. The groove is tapered such that the width of the groove increases continuously along the sides of the insert.

The subject invention is also directed to a face milling cutter adapted to be advanced in a feed direction along a cutter assembly centerline against a workpiece, wherein the assembly is comprised of a milling cutter body and an insert, as just described, and oriented within the cutter such that the groove is widest at the cutting insert corner protruding the furthest from an axial location surface of the milling cutter.

BRIEF DESCRIPTION OF THE DRAWINGS

The exact nature of the present invention will become more clearly apparent with reference to the following detail specification taken in connection with the accompanying drawings in which.

DETAILED DESCRIPTION OF THE INVENTION

Based upon knowledge that proper chip formation may reduce cutting forces and cutting temperatures by permitting the chip to form along an unobstructed path as it separates from the workpiece, the inventor has discovered that a chip control groove on the top face of the insert may be tapered such that during a metalworking operation each chip forms naturally until it is distanced from the workpiece surface. Furthermore, the chip control groove forms the chip in a generally helical configuration and deflects the chip away from the workpiece. A primary use of such an insert is with a milling cutter and, as such, chips are formed from each insert during a pass of the milling cutter until the associated cutting insert completes a pass over the workpiece and the chip is swept from the workpiece. Forming cutting chips in such a fashion not only provides a desirable chip configuration but, furthermore, requires a lower cutting force and subsequently generates less heat during the cutting process. Cutting tools subjected to lower forces and lower temperatures last longer and permit a more precise machining operation on a cooler workpiece, which are all preferred conditions.

The tip of the cutting insert initially contacting a workpiece is subjected to the greatest cutting forces and highest temperatures and produces a relatively large chip with a large curling radius. As a result, the inventor has discovered that the curvature of a chip control groove closest to this tip should be larger than the width of the same groove furthest from this point. This permits the chip to form naturally and enter the groove at the wide end of the groove, where the groove radius approximates the natural curvature of the chip. This chip also extends to the portion of the cutting insert which engages the workpiece adjacent to the leading tip, however, the radius of curvature of this chip portion decreases as the distance from the leading tip increases. The inventor has taken advantage of this phenomena by providing a chip control groove having the largest width closest to the leading tip and the smallest width furthest from the leading tip to promote a natural chip formation but to direct such a formation into a helical pattern and away from the workpiece. A typical chip formed in this fashion will be as wide as the width of the workpiece engaged by the cutting insert. By permitting the chip to form naturally and by urging the chip into a helical formation directed away from the workpiece, the inventor has discovered a design that minimizes cutting forces and heat generation, thereby minimizing degradation of the cutting edges of the cutting insert.

Figure 1:
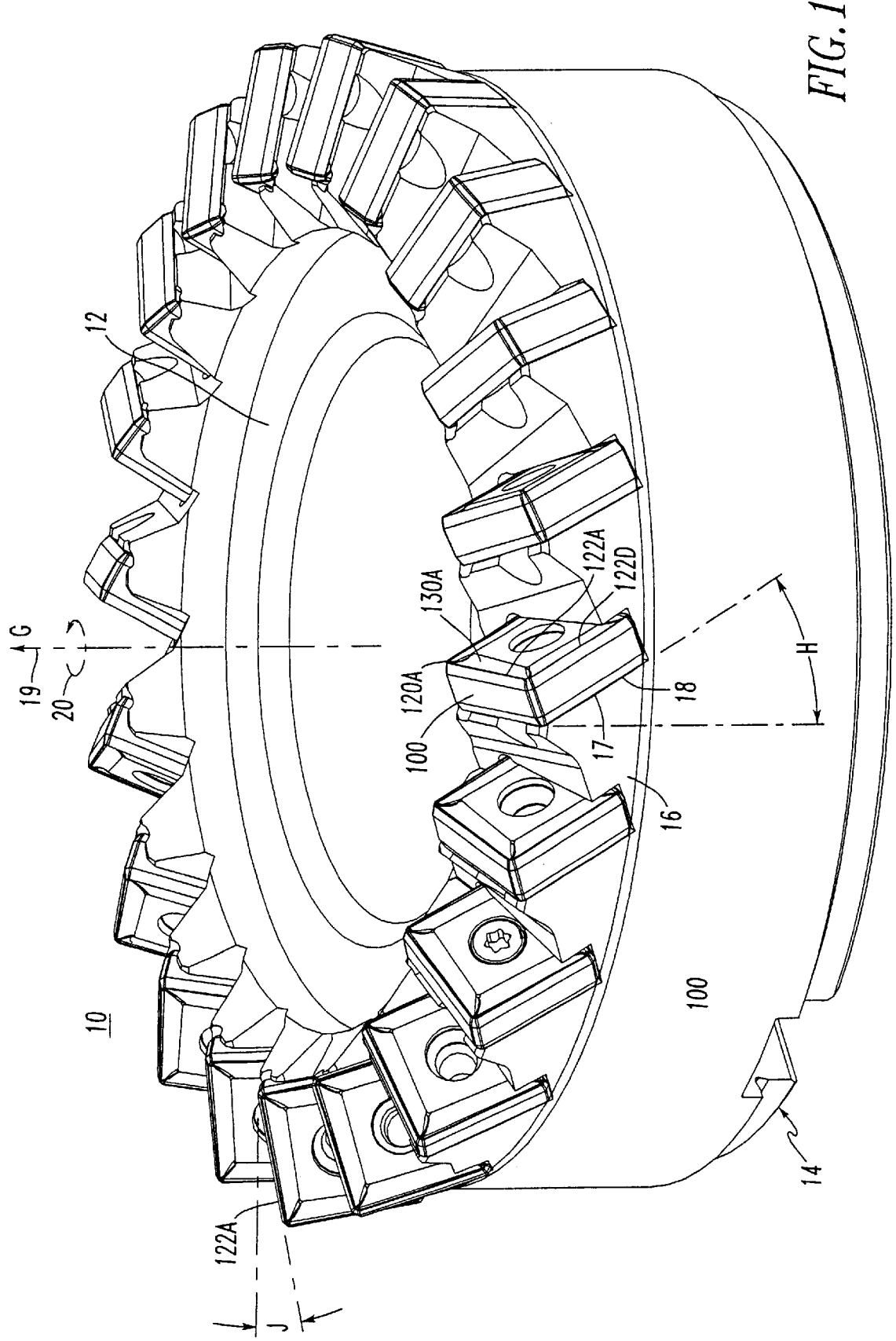
FIG. 1 is a perspective view of the insert in accordance with the subject invention mounted within a face milling cutter body.

FIG. 1 illustrates a face milling cutter 10 having a milling cutter body 12 which, at its base 14, is mounted upon an adapter (not shown). All milling cutters have a defined gauge line or surface upon which key dimensions, including cutting insert locations, are based. The face milling cutter 10 uses the base 14 for axial dimensions in a direction parallel to the centerline 19 of the cutter body 12 and therefore the base 14 acts as the gauge line or axial location surface.

The corner 120A of the cutting insert 100 has a cutting edge 122A which is oriented in a direction generally radial to the centerline 19. The corner 120A also defines a leading tip which extends furthest from the base 14, which is the axial location surface.

A plurality of mounting lugs 16 are formed on the outer periphery of the cutter body 12. Each mounting lug 16 includes a pocket 18 into which a cutting insert 100 may be mounted. As the milling cutter 10 rotates about the centerline 19 in a direction illustrated by arrow 20, the cutter 10 is advanced toward a workpiece in a feed direction G and first the cutting edge 122A at the tip corner 120A, and then the cutting edge 122A adjacent to the corner 120A engage and machine a workpiece (not shown). The subject invention is directed to the cutting insert 100 used to perform this operation and an assembly of the face milling cutter combined with such an insert.

Figure 4:
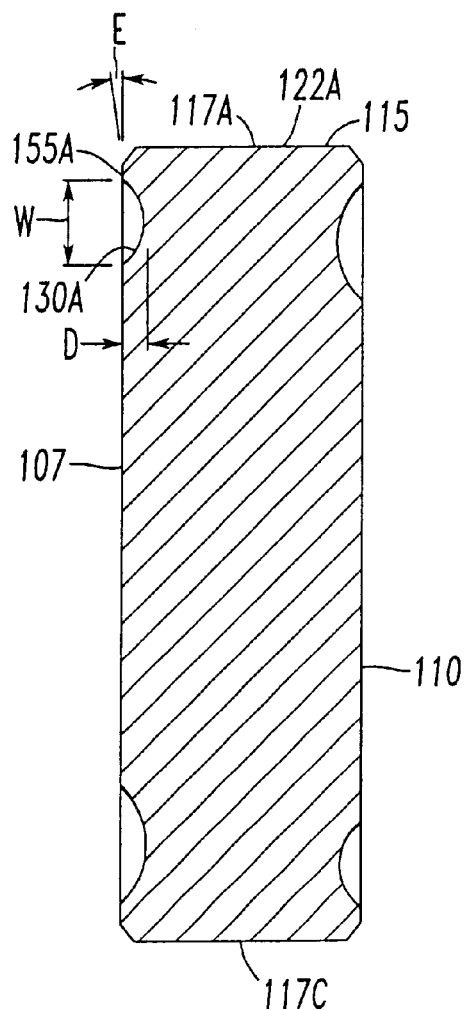
FIG. 4 is a sectional view taken along lines "4—4" in FIG. 2.
Figure 5:
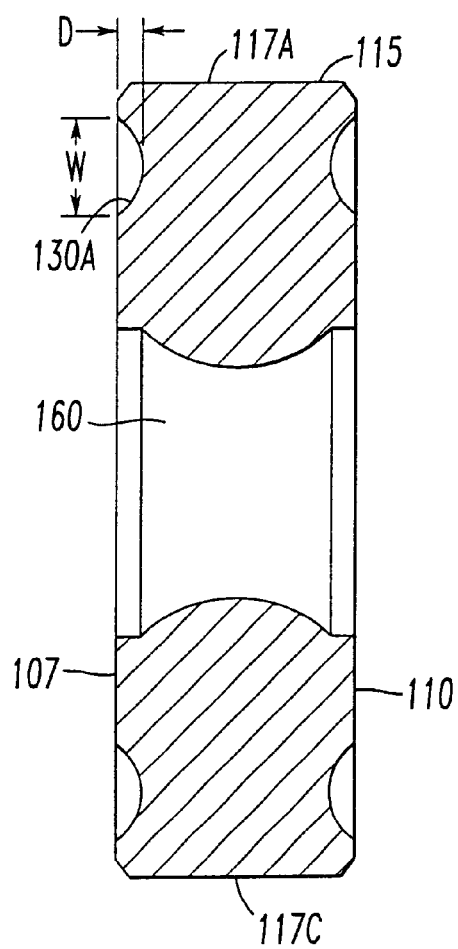
FIG. 5 is a sectional view taken along lines "5—5" in FIG. 2.

Directing attention to FIGS. 2–5, the cutting insert 100 may be comprised of a polygonal body 105 of wear-resistant material. The body 105 includes a top surface 107 and a bottom surface 110 opposing the top surface 107. Between the top surface 107 and the bottom surface 110 is a peripheral wall 115 with sides 117 A, B, C, D and corners 120 A, B, C, D. Cutting edges 122 A, B, C, D are defined by the intersection of each side 117A, B, C, D with the top surface 107. The top surface 107 may be comprised of a central plateau 125 and at least one groove 130A extending along one side 117A of the insert 100 from corner 120A to 120B. This permits any chips produced during a metalworking operation to be guided along the entire side 117A of the cutting insert 100. The groove 130A has a central axis 135A which lies between the central plateau 125 and one side 117A of the insert 100. The groove 130A is tapered such that the width W of the groove 130A increases continuously along the side 117A of the insert 100. As an example, FIG. 4 shows the narrow end of the groove 130A and the wider end of the groove 130C, wherein the grooves 130A, 130C are identical but reverse images of one another. It should be appreciated that the depth D of the groove 130A may increase as the width W increases but such an increase in depth should not be a limitation and that the depth D does not necessarily increase as the width W increases.

While only a single groove 130A is discussed herein, it should be appreciated that the insert 100 may be symmetric and that additional grooves may be present on the top surface 107 of the insert 100, as illustrated by groove 130B, 130C and 130D. The features of these grooves are identical to the features of groove 130A. Additionally, similar details may be present at the bottom surface 110 of the insert 100. In the arrangement illustrated in FIG. 2, each groove 130A-D terminates before intersecting with the adjacent side 117A–O.

Figure 6:
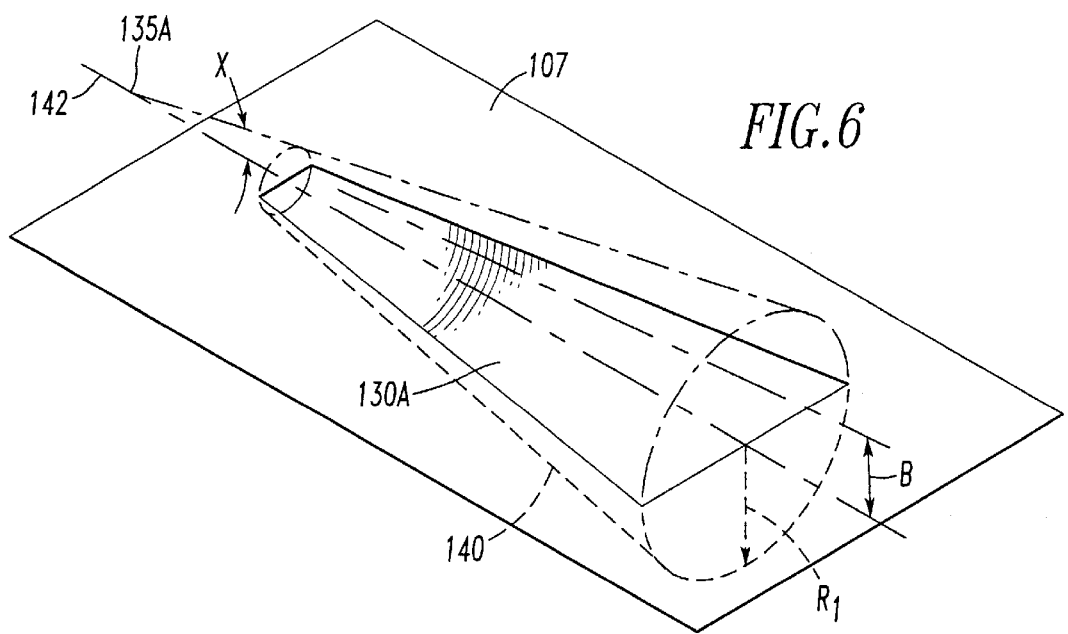
FIG. 6 is a perspective sketch illustrating one mechanism by which the groove in the subject cutting insert may be formed.
Figure 7:
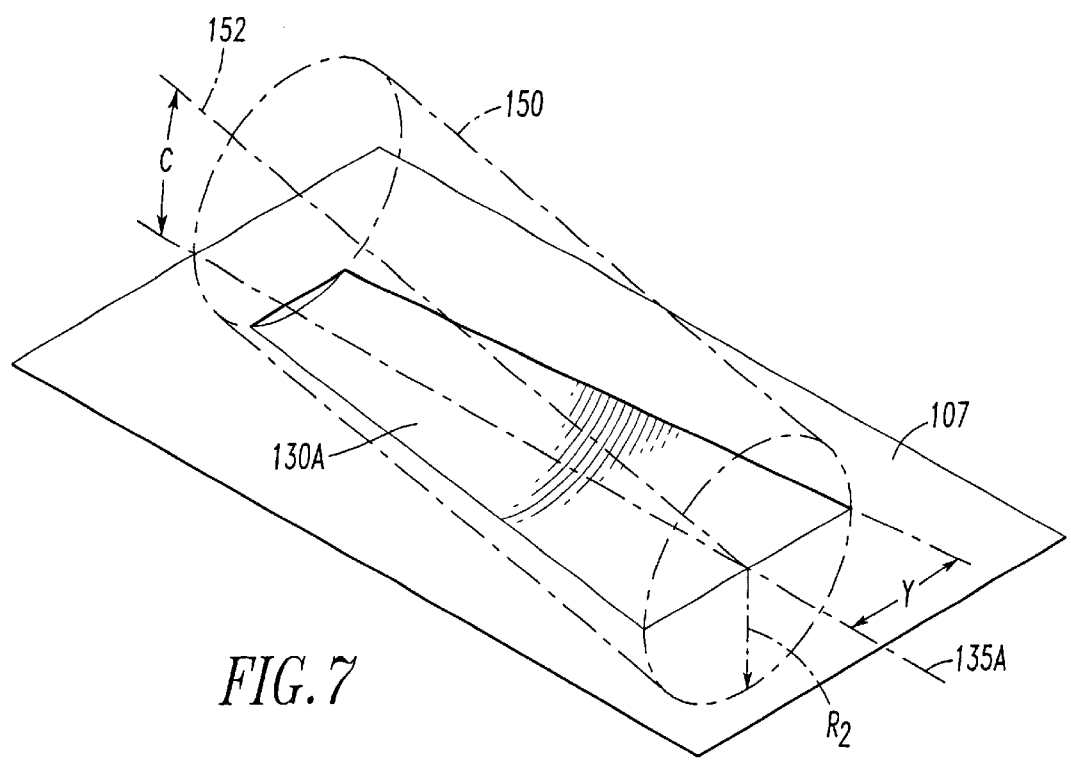
FIG. 7 is a perspective sketch illustrating another mechanism by which the groove of the subject insert may be formed.
Figure 8:
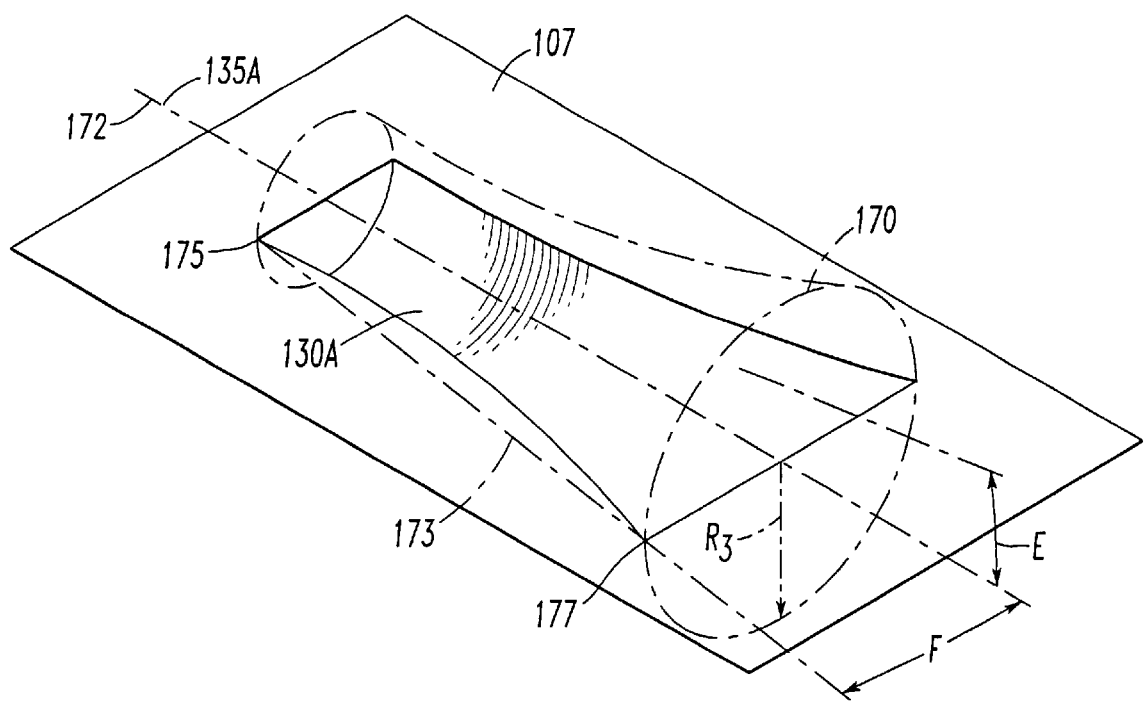
FIG. 8 is a perspective sketch illustrating yet another mechanism by which the groove of the subject invention may be formed.

The groove 130A is comprised of curved surfaces and the particular shape of the groove may be best described through the illustrations found in FIGS. 6, 7 and 8.

Figure 2:
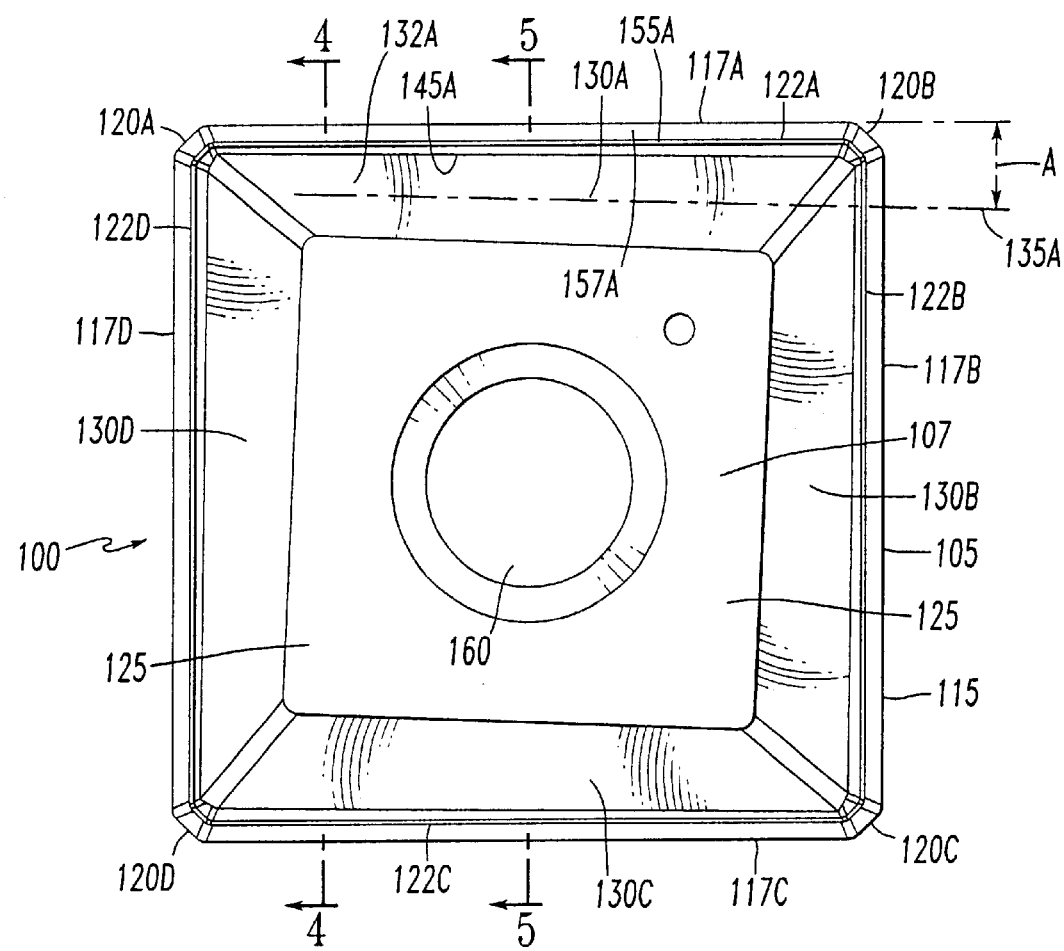
FIG. 2 is a top view of the insert in accordance with one embodiment of the subject invention.
Figure 3:
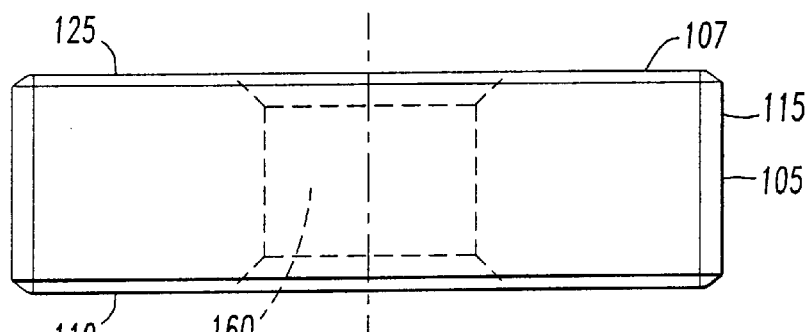
FIG. 3 is a side view of the insert illustrated in FIG. 2.

Directing attention to FIG. 6, the groove 130A is defined by a portion of a straight-wall cone 140. The straight-wall cone 140 has a cone axis 142 which acts as the central axis 135A of the groove 130A. As illustrated in FIG. 2, the central axis 135A of the groove 130A forms an angle A with the adjacent cutting edge 122A of between 0° to 20°. Returning to FIG. 6, it should be appreciated that, when the groove 130 A is formed using the straight-wall cone 140, the cone axis 142 may be identical to the groove axis 135A.

Returning again to FIG. 2, it should also be noted that the groove edge 145A closest to the cutting edge 122A is parallel to that cutting edge 122A. When the groove 130A is formed to conform to the straight-wall cone 140 (FIG. 6), the groove 130A may be defined by the straight-wall cone 140 having a cone angle X of between 2° to 12°.

By definition, a cone is comprised of a plurality of circles placed adjacent to each other, whereby the circles continuously decrease in diameter from one end of the cone to the other. In accordance with the subject invention, the straight-wall cone 140 used to define the groove 130A has a radius R1 at the wide end of the straight-wall cone 140 of between about 0.05 and 0.20 inches. In a preferred embodiment, the radius R1 at the wide end of the straight-wall cone 140 is approximately 0.087 inches.

As illustrated in FIG. 2, it is possible to orient the cone axis 142 (shown as axis 135A) relative to the side 117A of the insert by an angle A. It is also possible to orient the cone axis 142 in a vertical direction such that the cone axis 142 forms a vertical angle B of between −10° to +10° with the top surface 107, as shown in FIG. 6. The lowermost portion of the groove 130A may be made parallel to the top surface 107 by orienting the straight-wall cone 140 such that the vertical angle B equals the cone angle X.

While so far the discussion has been focused upon the formation of the groove 130A so that it conforms to a straight-wall cone, a tapered groove 130A may also be formed using a cylinder as a template, as illustrated in FIG. 7. In particular, the cylinder 150 may be oriented with the top surface 107 of the insert such that the cylinder axis 152 forms a vertical angle C with the top surface 107 and thereby causing the projection of the cylinder 150 on the top surface 107 to be tapered. The cylinder 150 may have a radius R2 of between approximately 0.05 and 0.20 inches with a preferred radius R2 of approximately 0.087 inches. The vertical angle C may have a value of between 1° and 10°.

The vertical angle C of the cylinder may be selected such that a projection of a footprint of the groove 130A upon the insert surface 107 has a taper with an angle Y of between 2° and 20°.

Briefly returning to FIG. 2 and with reference to FIG. 6, the axis 152 of the cylinder 150 may be angled at a horizontal angle A with the cutting edge of the insert to orient the projection of the cylinder 150 on the top surface 107, wherein the value of the horizontal angle A may be between 0° and 20°.

Directing attention to FIG. 8, in yet another embodiment, the groove 130A is defined by a portion of a curved-wall cone 170. The curved-wall cone 170 is symmetric about a curved-wall cone axis 172 which may be co-axial with the central axis 135A of the groove 130A. As illustrated in FIG. 2, the central axis 135A of the groove 130A forms an angle A with the adjacent cutting edge 122A of between 0° to 20°. Returning to FIG. 8, it should be appreciated that, when the groove 130A is formed using the curved-wall cone 170, the curved-wall cone axis 172 may be identical to the groove axis 135A.

It is also possible to orient the curved-wall cone axis 172 in a vertical direction to form with the top surface 107 a vertical angle E of between −10° to +10°, as shown in FIG. 8.

Returning again to FIG. 2, it should also be noted that the groove edge 145A closest to the cutting edge 122A is parallel to that cutting edge 122A. When the groove 130A is formed to conform to the curved-wall cone 170, the groove edge 145A will be curved in accordance with the curvature of the curved-wall cone 170 and, with the exception of the possibility of one tangent point, will not be parallel to the cutting edge 122A. Nevertheless, a line 173 connecting the two ends 175, 177 of the curved-wall on the top surface 107 of the insert will form an angle F with the cone axis 172 of between 2° to 12°.

The curved-wall cone 170 is comprised of a plurality of circles placed adjacent to each other, whereby between the ends of the curved-wall cone, the circles decrease in diameter. In accordance with the subject invention, the curved-wall cone 170 used to define the groove 130A has a radius R3 at the wide end of the cone between about 0.20 and 0.05 inches. In a preferred embodiment, the radius R3 at the wide end of the cone 140 is approximately 0.087 inches.

Although it is entirely possible for the cutting edge 122A of the insert 100 to be a sharp edge and essentially adjacent to the side 122A of the insert 100, in general the strength of the cutting edge 122A is bolstered through the introduction of a land 155A (FIG. 2) positioned between the groove 130A and the side 117A of the insert 100. As illustrated in FIG. 4, the land 155A may form an angle E with the top surface 107 of the insert 100 of between 0° and 20°. Additionally, depending upon the orientation of the insert 100 within a cutter body, it may be desirable to include a clearance surface 157A between the side 117A and the land 155A or, if there is no land, between the side 117A and the cutting edge 122A.

The insert 100 may have a central hole 160 (FIG. 2) through which a fastener (not shown) may extend to secure the insert 100 within the pocket 18 (FIG. 1) of the milling cutter 10. In the alternative, and as readily known to those skilled in the art of manufacturing inserts, it is entirely possible for the insert 100 to have a solid central portion, such that the insert 100 may be fit within the pocket 18 of the milling cutter 10 and securely clamped therein.

The insert illustrated in FIGS. 2–5 has a central plateau 125 that is generally planar and centrally positioned adjacent to each of the grooves 130A, 130B, 130C and 130D. It should be appreciated that the purpose of the central plateau 125 is to provide a seating surface within the pocket of the milling cutter and, for that reason, the plateau may be level with or above the cutting edges 122A, B, C, D. It is also possible and easily envisioned that the plateau 125 may be lower than the cutting edges 122A, B, C, D.

So far, the cutting insert 100 has been discussed as a lay down insert. It is entirely possible for the insert to be an on-edge insert. Directing attention to FIGS. 9–12, such an insert will be discussed.

Figure 9:
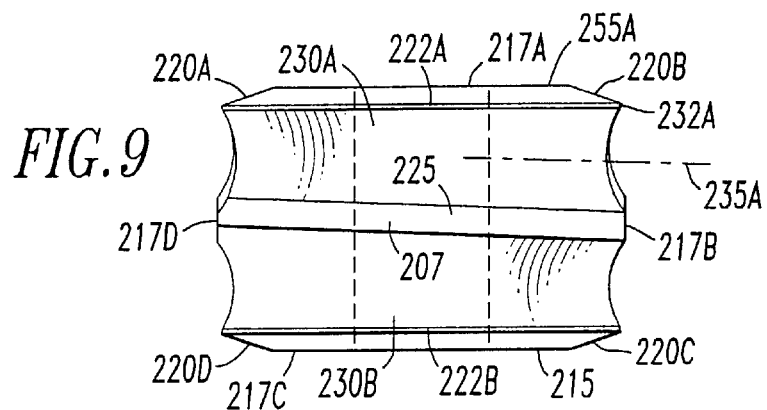
FIG. 9 is a top view of the cutting insert in accordance with the second embodiment of the subject invention.
Figure 10:
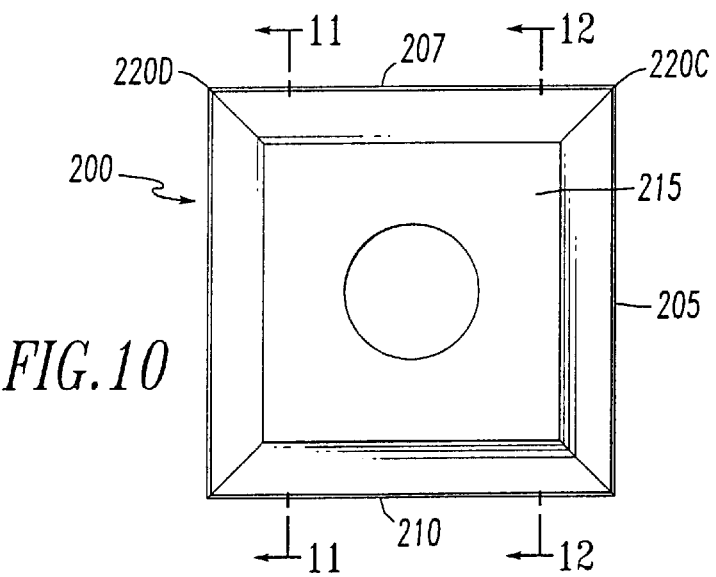
FIG. 10 is a side view of the insert illustrated in FIG. 9.
Figure 11:
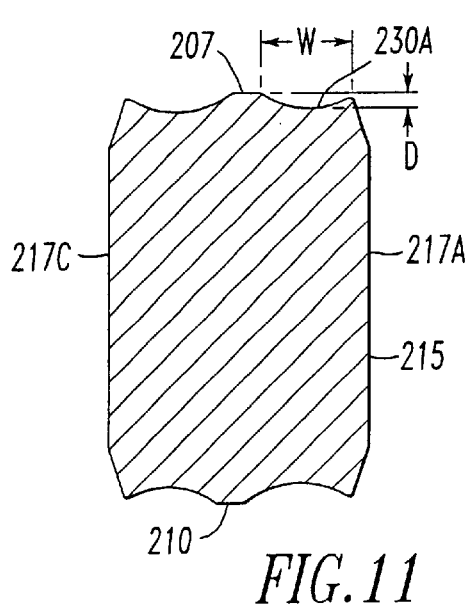
FIG. 11 is a sectional view along lines "11—11" in FIG. 9.
Figure 12:
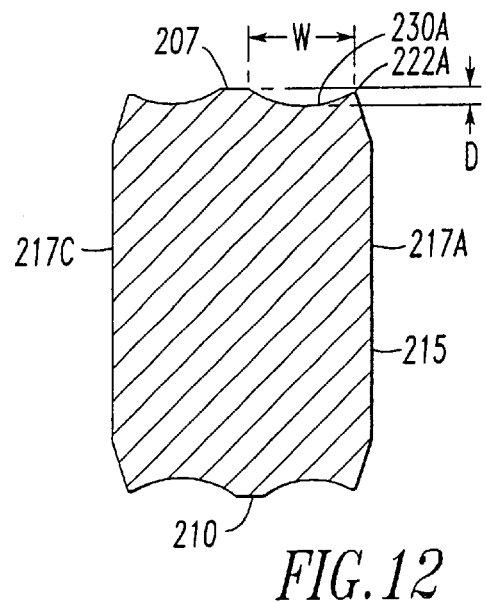
FIG. 12 is a sectional view taken along lines "12—12" in FIG. 9.

The cutting insert 200 is an on-edge insert because it may be oriented in a milling cutter body such that the perimeter edges of the insert are presented to the workpiece for cutting, as opposed to the top or bottom surfaces of the cutting insert. The cutting insert 200 may be comprised of a polygonal body 205 of wear-resistant material. The body 205 includes a top surface 207 and a bottom surface 210 opposing the top surface 207. Between the top surface 207 and the bottom surface 210 is a wall 215 defining sides 217A, B, C, D and corners 220 A, B, C, D. Cutting edges 222A, B are defined by the intersection of sides 217A, C with the top surface 207, respectively. The top surface 207 may be comprised of a central plateau 225 and at least one groove 230A extending along one side 217A of the insert 200. The groove 230A has a central axis 235A which lies between the central plateau 225 and one side 217A of the insert 200. The groove 230A is tapered such that the width W of the groove 230A increases continuously along the side 217A. As an example, groove 230A has a smaller width W at one end of the insert, as illustrated in FIG. 11, than it does at the other end of the insert, as illustrated in FIG. 12. As previously mentioned, it is not necessary for the depth D to increase as the width W of the groove 230A increases. As illustrated in FIG. 9, when more than one groove is present, groove 230A may extend until it intersects with an adjacent groove.

While only a single groove 230A has been discussed, it should be appreciated that the insert may be symmetric and an additional groove may be present on the top surface 207 of the insert 200, as illustrated by groove 230B. The features of this groove 230B is identical to the features of groove 230A.

The groove 230A is comprised of curved surfaces and the particular shape of the groove may be best described in a fashion similar to that of groove 130A associated with the lay-down insert 100 in FIGS. 2–5 wherein the groove details are further provided through the illustrations in FIGS. 6, 7 and 8. The same variations of shape and orientation of the cone and cylinder apply equally to the on-edge insert 200 as to the lay-down insert 100 and therefore will not be discussed further.

While only grooves 230A, B are discussed herein, it should be appreciated that additional grooves may be present on the bottom surface 210 of the insert 200 and also on the insert surfaces between sides 217A, C and adjacent to and between the top surface 207 and the bottom surface 210. The features of each of these grooves may be identical to the features of groove 130A. Additionally, similar details may be present at the bottom surface 210 of the insert 200.

The insert illustrated in FIGS. 9–12 has sides 217A, C that are generally planar. It should be appreciated that the purpose of the sides 217A, C is to provide a seating surface within the pocket of the milling cutter and, for that reason, the sides 217A, C may be level with or above the cutting edges 222A, B. It is also possible and easily envisioned that the side 217A, C may be lower than the cutting edges 222A, B. Additionally, depending upon the orientation of the insert 200 within a cutter body, it may be desirable to include a clearance surface 257A between the side 217A and the land 255A or, if there is no land, between the side 217A and the cutting edge 222A.

Returning to FIG. 1, a face milling cutter 10 is shown having a cutting insert 100 which, as previously mentioned, is oriented within the cutter body 12 such that the radially inward corner 120A protrudes forwardmost from the base 14, which is the axial location surface, in the direction of feed G of the cutter body 12 to engage a workpiece (not shown). To orient the cutting insert 100 in this fashion, the insert 100 may be mounted within the cutter body 12 with an angle H formed by the bottom 17 of the pocket 18 and the centerline 19 of between 20° to 30°. Additionally, the insert 100 may be mounted within the cutter body 12 with an angle J formed by the cutting edge 122A (insert of left side of FIG. 1 used) and a line radial to the centerline 19 of between 10° to 20°. The angle H and the angle J are determined by the cutter body 12 but also by the configuration of the cutting insert 100 and in particular by the land angle associated with the cutting edges of the cutting insert 100.

It is important, however, in accordance with the subject invention, that the cutting insert, when secured within a pocket 18 of the cutter body 12, is oriented such that the wider end of the groove 130A is positioned radially inwardly and that the corner associated with this wide end is positioned forwardmost in the direction of feed F.

Again returning to FIG. 1, the cutting insert 100 is referred to as a lay-down insert because the largest seating surface within the pocket 18 of the cutter body 12 is generally defined by a plane extending radially from the centerline 19 of the cutter body 12. On the other hand, the cutting insert 200 is referred to a an on-edge insert because the largest seating surface for the insert is generally defined by a plane tangential to a circle about the centerline 19 of the cutter body 12. The on-edge cutting insert 200 is not illustrated within the cutter body and the pocket 18 would have to be modified to accept such a cutting insert. However, such a modification is well known by those skilled in the art of metalworking.

Again, of particular importance with either of these inserts is the topography of the insert face exposed to the workpiece for cutting. The width W of the groove 130A must continuously increase along the side of the insert 100 to promote the natural formation of chips along the cutting edge.

It should be appreciated the milling cutter 10 discussed in FIG. 1 is intended for use in the feed direction G indicated therein. It is entirely possible and known to those skilled in the art of milling to orient the pockets 18 of the cutter body 12 and thereby orient the insert 10 therein such that the cutter 10 may be advanced in a direction perpendicular to the feed direction G and effectively machine a workpiece with the same beneficial formation of chips as previously discussed herein.

Finally, cutting insert 100 and cutting insert 200, as illustrated in FIGS. 2 and 9, respectively, are quadrilateral. It should be appreciated that either the lay down insert 100 or the on-edge insert 200 may have the shape of a square, a rectangle or a triangle.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A milling cutting insert comprising a polygonal body of wear resistant material, said body including a top surface and a bottom surface opposing one another and therebetween a peripheral wall with sides and corners, the intersection of said peripheral wall and said top surface forming a cutting edge, said top surface comprising a groove having a central axis and extending along the entire length of one side, wherein the groove is tapered such that the width of the groove increases continuously along the side of the insert from one side corner to an adjacent side corner and wherein a narrow end of the groove is closest a wide end of a neighboring groove.

2. The cutting insert according to claim 1, wherein the groove is defined by a portion of a straight-wall cone.

3. The cutting insert according to claim 2, wherein the cone has a cone axis and the cone axis forms an angle A with the adjacent cutting edge of between 0° to 20°.

4. The cutting insert according to claim 2, wherein the cone axis of the cone is oriented such that the groove edge closest to the cutting edge is parallel to that cutting edge.

5. The cutting insert according to claim 2, wherein the groove is defined by a straight-wall cone having a cone angle of between 2° to 10°.

6. The cutting insert according to claim 2, wherein the radius at the wide end of the straight-wall cone is between 0.05 and 0.20 inches.

7. The cutting insert according to claim 6, wherein the radius at the wide end of the straight-wall cone is 0.087 inches.

8. The cutting insert according to claim 2, wherein the cone axis forms a vertical angle B of between −10° to +10°.

9. The cutting insert according to claim 2, wherein the lowermost portion of the groove defines a line that is parallel with the top surface of the insert.

10. The cutting insert according to claim 1, wherein the groove is defined by a portion of a cylinder.

11. The cutting insert according to claim 10, wherein the cylinder has a radius of between 0.20 and 0.05 inches.

12. The cutting insert according to claim 11, wherein the cylinder has a radius of 0.087 inches.

13. The cutting insert according to claim 10, wherein the cylinder has a central axis which forms a vertical angle C with the cutting edge such that the projection of the cylinder upon the top surface of the insert is tapered.

14. The cutting insert according to claim 13, wherein the vertical angle C is between 1° to 10°.

15. The cutting insert according to claim 13, wherein the cylinder is angled to a vertical angle whereby a projection of a footprint upon the insert surface has a taper of between 2° and 20°.

16. The cutting insert according to claim 10, wherein the axis of the cylinder forms a horizontal angle E with the cutting edge of the insert.

17. The cutting insert according to claim 16, wherein the horizontal angle is between 0° to 20°.

18. The cutting insert according to claim 1, wherein the groove is defined by a curved-wall cone having curved diverging lines about a central axis.

19. The cutting insert according to claim 18, wherein a straight line projected from the intersection of each end of the curved-wall cone with the top surface of the cutting insert forms and angle with the central axis of between 2° to 10°.

20. The cutting insert according to claim 18, wherein the radius at the wider end of the curved-wall cone is between 0.20 and 0.05 inches.

21. The cutting insert according to claim 18, wherein the curved-wall cone may be oriented such that the central axis forms a vertical angle with the central axis of between −10 to +10°.

22. The cutting insert according to claim 1, further including a land extending between the cutting edge and the groove.

23. The cutting insert according to claim 22, wherein the land forms an angle E with the top surface of the insert of between 0° to 20°.

24. The cutting insert according to claim 1, wherein a central hole extends through the insert adapted to accept a mounting bolt.

25. The cutting insert according to claim 1, wherein the central portion of the insert is solid and adapted to accept a clamp.

26. The cutting insert according to claim 1, further comprising a planar plateau centrally positioned adjacent to the groove.

27. The cutting insert according to claim 26, wherein the plateau is level with or above the cutting edge.

28. The cutting insert according to claim 26, wherein the plateau is lower than the cutting edge.

29. The cutting insert according to claim 1, wherein the insert is a lay-down insert.

30. The cutting insert according to claim 1, wherein the insert is an on-edge insert.

31. The cutting insert according to claim 1, wherein the shape of the insert is one selected from the group of square, rectangular and triangular.

32. The cutting insert according to claim 1, wherein there is a groove associated with each the top surface and the bottom surface of the insert.

33. The cutting insert according to claim 1, wherein there is one groove associated with each side of the insert.

34. The cutting insert according to claim 33, wherein there is a land between each cutting edge and groove.

35. A face milling cutter adapted to be advanced in a feed direction along a cutter assembly centerline against a workpiece, wherein the assembly is comprised of:

a) a milling cutter body about the assembly centerline, wherein the milling cutter body has an outer perimeter, pockets positioned radially about the perimeter of the body and an insert axial location surface;

b) a plurality of milling cutter inserts, wherein each insert has a polygonal body of wear resistant material, said body including a top surface and a bottom surface opposing one another and therebetween a peripheral wall with sides and corners, wherein the intersection of the peripheral wall and the top surface form a cutting edge, c) wherein the top surface has:
      1) a groove having a central axis and extending along the entire length of one side,
      2) wherein the groove is tapered such that the width of the groove increases continuously along the side of the insert to define a narrow end and a wide end of the groove, and wherein the narrow end of the groove is closest the wide end of the neighboring groove, and d) wherein each cutting insert is oriented within a pocket such that one corner of the insert is furthest from the axial location surface and the wide end of the groove associated with the cutting edge facing the feed direction is adjacent to that corner.

* * * * *